United States Patent [19]

Ordelheide et al.

[11] Patent Number: 4,846,969

[45] Date of Patent: Jul. 11, 1989

[54] ACTIVATED SLUDGE DEVICE HAVING MOVABLE PERFORATED PLATES AND A NOZZLE FOR THE DESTRUCTION OF FOAM

[75] Inventors: Rolf Ordelheide; Hüdai Turgay, both of Berlin, Fed. Rep. of Germany

[73] Assignee: Borsig GmbH, Berlin, Fed. Rep. of Germany

[21] Appl. No.: 257,993

[22] Filed: Oct. 14, 1988

[30] Foreign Application Priority Data

Oct. 16, 1987 [DE] Fed. Rep. of Germany ....... 3735080

[51] Int. Cl.$^4$ ...................... B01D 19/02; B01D 17/00
[52] U.S. Cl. ................. 210/221.2; 210/541; 239/593; 239/455
[58] Field of Search ................. 210/221.1, 221.2, 541; 239/593, 455

[56] References Cited

U.S. PATENT DOCUMENTS 4,431,531 2/1984 Hollingsworth ................. 210/221.2
4,655,918 4/1987 Eertink ........................... 210/221.2

FOREIGN PATENT DOCUMENTS

3151153 A1 6/1983 Fed. Rep. of Germany ... 210/221.2
0617559 7/1978 U.S.S.R. .......................... 239/455

*Primary Examiner*—Richard V. Fisher
*Assistant Examiner*—Cynthia L. Nessler
*Attorney, Agent, or Firm*—Max Fogiel

[57] ABSTRACT

An arrangement for the destruction of foam building up on a sewage surface in form of activated sludge, in which a reaction vessel holds the suspended foam. The reaction vessel has perforated plates which may be raised and lowered. The reaction vessel is furthermore provided with an inlet pipe connection for untreated sewage, and a discharge pipe for the treated suspension. The reaction vessel is closed off at its upper side by a plate member which has at least one flow-through opening. A nozzle located within an enclosure, is connected to this flow-through opening. The nozzle has a lower wall and an upper wall disposed at an acute angle relative to one another. The lower wall and the upper wall of nozzle, furthermore, have adjacent edges forming an outlet opening of the nozzles. One of the walls of the nozzle is pivotably movable relative to the other wall.

6 Claims, 4 Drawing Sheets

ACTIVATED SLUDGE DEVICE HAVING MOVABLE PERFORATED PLATES AND A NOZZLE FOR THE DESTRUCTION OF FOAM

DESCRIPTION

The present invention relates to a device for the destruction of foam which builds up on the surface of a sewage—activated sludge—suspension in a reaction vessel having the features described in the preamble to claim 1.

A general type of reaction vessel is known from the German Offenlegungsschrift DE-OS No. 31 51 153. The air which is blown into the reaction vessel and of which the oxygen content is required for bacterial reactions is dispersed by means of perforated plates. As the result of this design, a thoroughly mixed reaction volume, free from any dead space, is obtained.

Because of the movement of the perforated plates and the aeration, foam is developed on the surface of the suspension in an undesired manner. It is known that, in order to counteract the formation of foam, anti-foaming agents can be added to the suspension. However, these agents can interfere with the bacterial reactions. It is also known that in order to destroy the foam, the foaming suspension can be passed through a bed consisting of fibrous material [EP-OS No. 231 158].

The reactor which operates on the lift-jet principle in accordance with the cited DE-OS No. 31 51 153, because of its particular construction, produces a vigorously foaming suspension, the foaming- and degassing-problems of which could not be adequately controlled by the previously-known methods, so that the reactor was restricted in its efficiency.

The problem to be solved by the present invention is how to provide a device with which the foam, even in cases of vigorous foam formation, can be effectually destroyed.

This problem can be solved with a general type of device by employment of the characterizing features given in claim 1. Expedient developments of the invention are given in the subsidiary claims.

With the device in accordance with the present invention, the sewage—activated sludge—suspension is forced over a breaking-down edge through the discharge slot of adjustable height. This causes the gas bubbles of the foam to be ruptured and the suspension is separated into a gas phase and a liquid phase. Before large volumes of foam can be formed, even the smallest bubbles are ruptured on the breaking-down edge. An enlargement of the foam bubbles is thus inhibited right at the place where they are formed.

Several examples of embodiment will now be discussed in greater detail with reference to the accompanying drawings in which.

Figure 1:
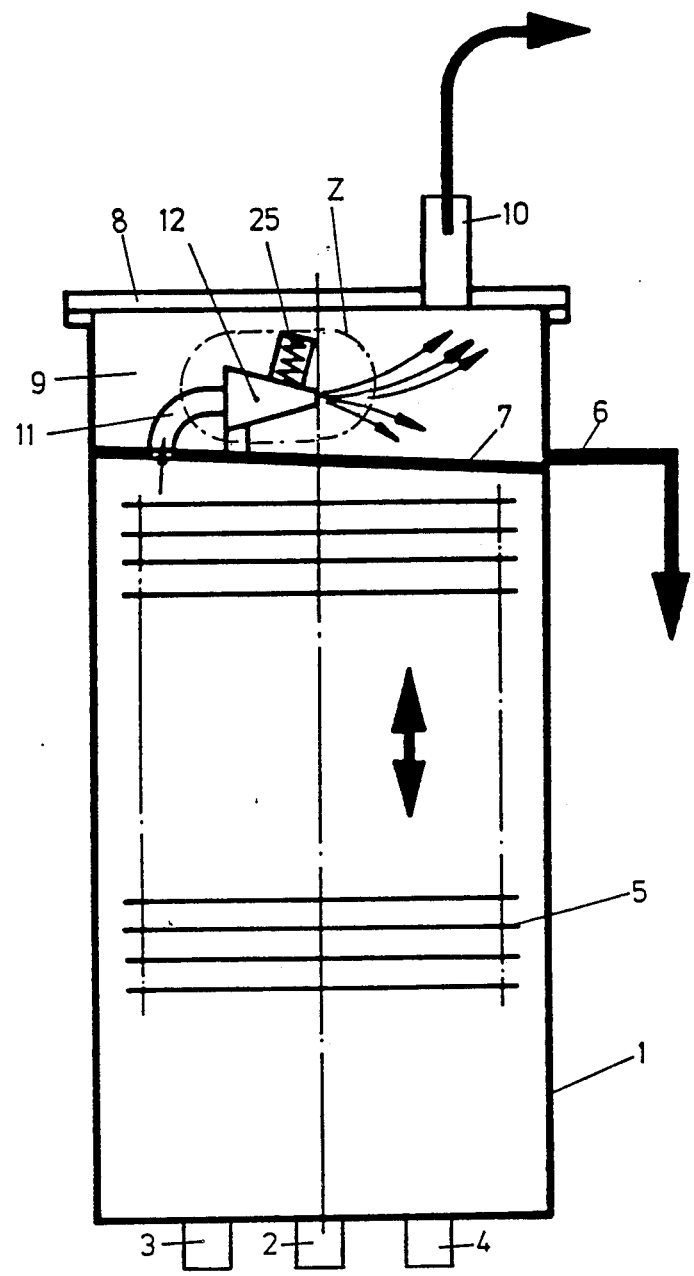
FIG. 1 is a reaction vessel with a device for the destruction of the foam.

A lift-jet reactor for sewage treatment with the aid of activated sludge consists of a reaction vessel 1, the base of which is provided with an inlet pipe connection 2 for sewage and with an inlet pipe connection 3 for an activated-sludge concentrate. A pipe connection 4 for introduction of air is also provided in the base of the reaction vessel 1.

Inside the reaction vessel 1 there is a stack of perforated plates 5, which can be raised and lowered with a reciprocating motion by means of a lifting device [not depicted]. By passing through the holes in the perforated plates during the raising and lowering movements, the sewage, the activated sludge and the air are intensively mixed together. The suspension treated in this way is continually discharged through a pipe 6.

The upper portion of the reaction vessel 1 is closed off by a plate 7 which is penetrated by one or more flow-through openings. A cover 8 is located on top of the vessel above the plate 7 and these, together with the upper region of the walls of the reaction vessel 1, enclose a chamber 9. The chamber 9 is provided with a discharge pipe 6 for the treated suspension and with a vent pipe 10 for the exhaust air. The flow-through opening in the plate 7 is connected by means of a pipe 11 within the chamber 9 to a nozzle 12 which serves for the destruction of the foam which is being formed on the surface of the suspension.

Figure 2:
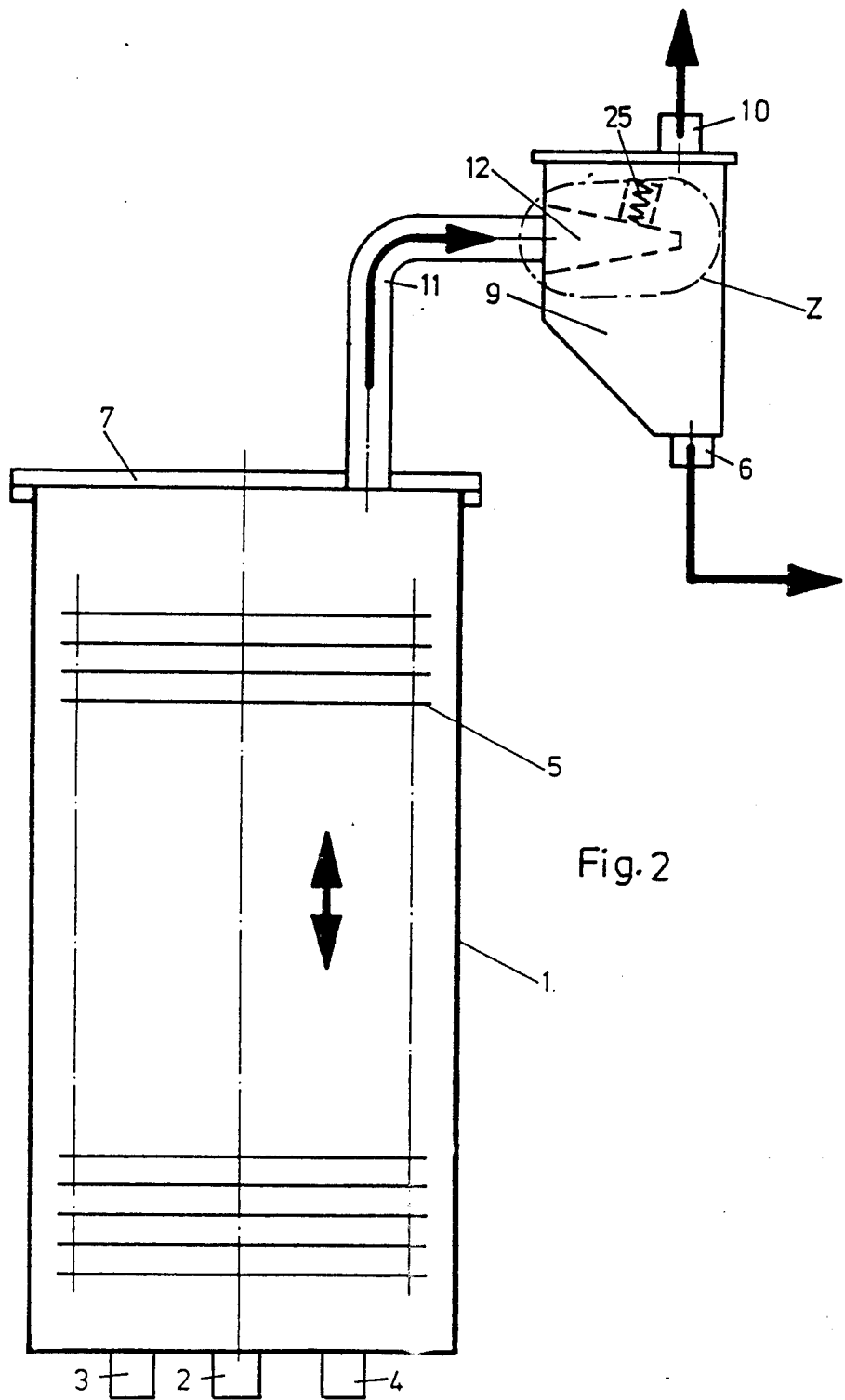
FIG. 2 is a reaction vessel with another type of device for destruction of the foam.

According to FIG. 2, the chamber 9 can be located outside the reaction vessel 1 in order to allow for better access to the nozzle 12. In this case, the reaction vessel is closed at the top by plate 7 and the vessel is connected to the nozzle 12 in the chamber 9 by way of the external pipeline 11. The discharge pipe 6 and the vent pipe 10 are connected to the chamber 9 which is outside the reaction vessel 1.

Figure 3:
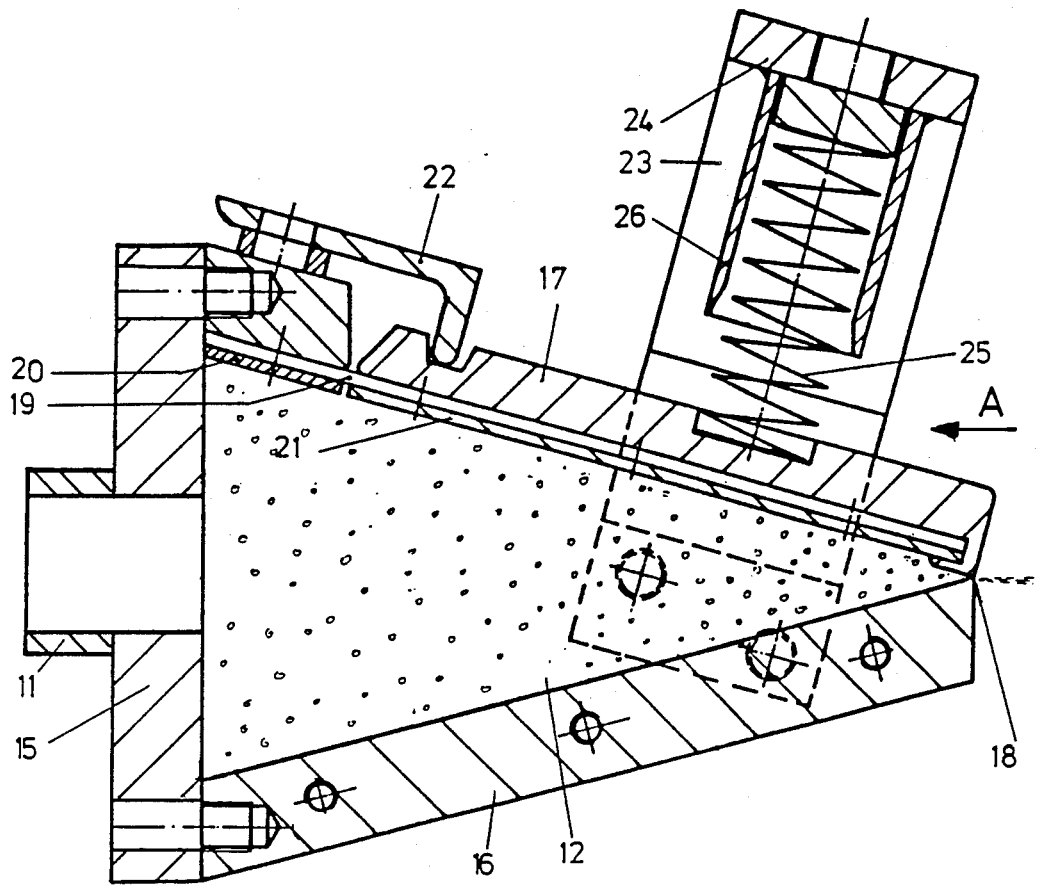
FIG. 3 is an enlarged detail of the region Z in FIG. 1 or FIG. 2 in longitudinal section and FIG. 4 is view of the object in FIG. 3 in the direction shown by the arrow A.
Figure 4:
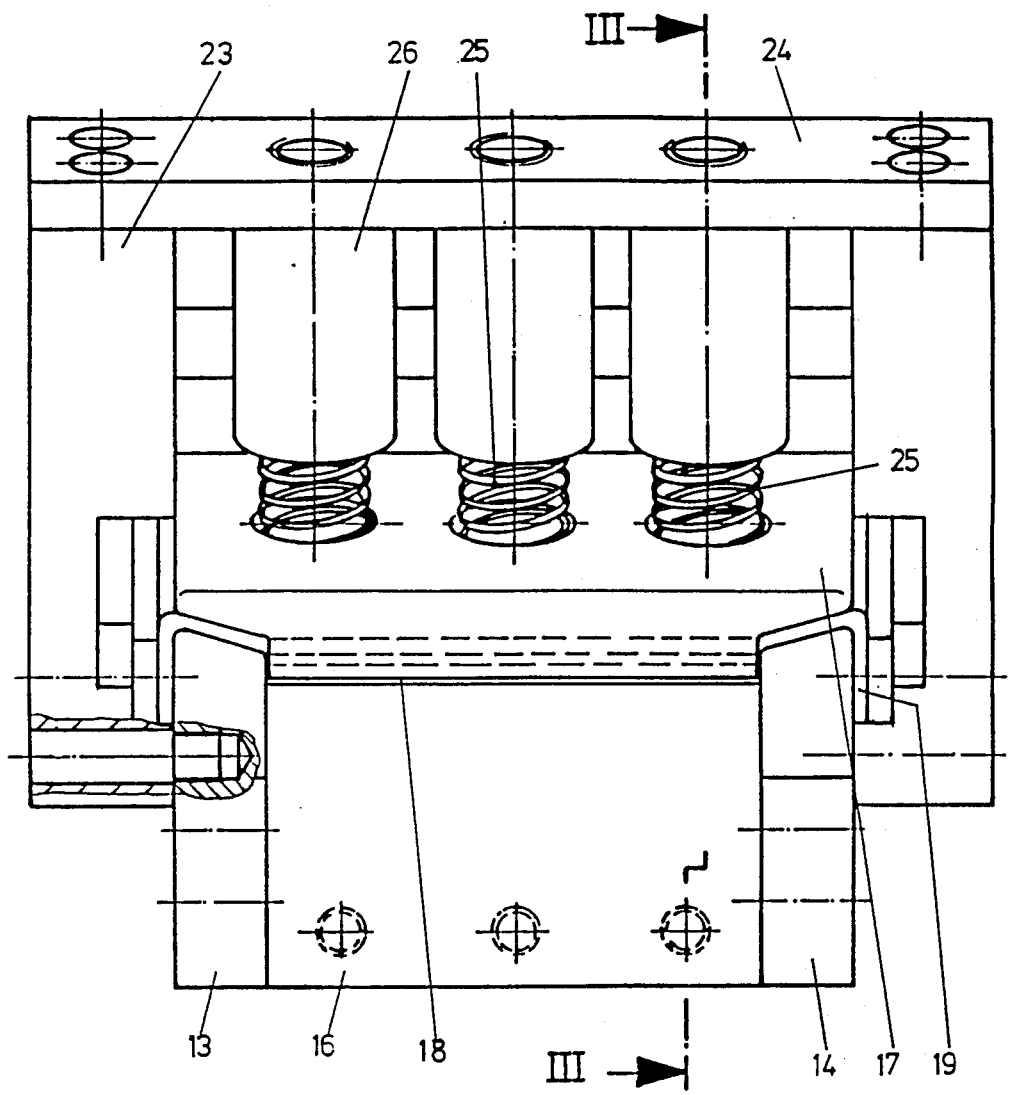

The nozzle 12 consists of two side walls 13, 14, a rear wall 15 with an opening for the pipeline 11 and a lower and upper wall 16 and 17 respectively which are disposed at an acute angle in relation to one another. These walls 16, 17 form surfaces for guiding the suspension towards an outlet opening 18 which is delimited by the adjacent edges of said walls 16, 17 [FIG. 3].

The lower sloping wall 16 is rigidly attached to the side walls 13, 14 and to the rear wall 15, all of which form the fixed body of the nozzle 12. The upper sloping wall 17 is connected to the fixed body of the nozzle 12 by way of a hinge membrane 19. The membrane 19 is attached to the moveable wall 17 and the fixed part of the nozzle 12 by means of the carrier plates 20, 21. A transverse angle-iron 22 provides a bearing edge which fits into a transverse groove in the top of the pivoting wall 17. A bracket 23 with a bar 24 extending transversely across the top of the nozzle 12 above the pivoting wall 17 is bolted to the side walls 13, 14. Helical compression springs 25, which are enclosed in cylindrical guide sleeves 26, are located between the underside of the cross bar 24 and the top of the wall 17, which is thus held against the fixed part of the nozzle 12 by the pressure exerted on it by the springs.

The suspension which flows continuously out from the reaction vessel 1 into the nozzle 12 is forced through the outlet slot 18 of the nozzle 12. The transport of the suspension and the required increase in velocity is achieved by a slight increase of the pressure in the reaction vessel 1. This pressure is built up by the decrease in size of the outlet slot 18 from the nozzle 12. The gas bubbles which have been formed are ruptured when they pass through the slot 18. Inside the chamber 9, the suspension separates into a degassed liquid phase, which is removed through the discharge pipe 6, and a gas phase which is exhausted through the vent pipe 10. An unquestionably good degassing which is effected in this manner, and inhibition of foam formation are the prerequisites for good settling-out behaviour of the bacterial agglomerates which are contained in the suspension in the sedimentation vessels [not depicted] which are coupled in series after the reaction vessel 1. With the aid of the nozzle 12, a pressure can be maintained in the reaction vessel 1 which favors the course of the bacterial reactions and decreases the amount of energy required for the reciprocating movement of the perforated plates 5. By means of an alteration of the compression force due to the springs 25, it is possible to vary the pressure on the nozzle 12. In this way there is a direct adaptation and adjustment of the degassing operation to suit the circumstances at any particular time.

We claim:

1. An arrangement for destruction of foam building up on a sewage surface in form of activated sludge, comprising: a reaction vessel in which said foam is suspended; perforated plates in said reaction vessel, said perforated plates being raisable and lowerable; said reaction vessel having an inlet pipe connection for untreated sewage and a discharge pipe for a treated suspension; a plate member closing off said reaction vessel at an upper side thereof; said plate member having at least one flow-through opening; a nozzle within an enclosure and connected to said flow-through opening; said nozzle having a lower wall and an upper wall disposed at an acute angle relative to one another; said lower wall and said upper wall having adjacent edges forming an outlet opening of said nozzle; one of said walls being pivotably moveable relative to the other one of said walls.

2. An arrangement as defined in claim 1, including a flexible hinge membrane for connecting said pivotably movable one of said walls to a fixed member of said nozzle.

3. An arrangement as defined in claim 2, including spring means for supporting said pivotably movable one of said walls against said fixed member of said nozzle.

4. An arrangement as defined in claim 1, wherein said enclosure has a discharge outlet for treated suspension and a vent pipe for exhaust air.

5. An arrangement as defined in claim 4, wherein said enclosure is located outside said reaction vessel.

6. An arrangement as defined in claim 4, wherein said enclosure is located inside said reaction vessel.

* * * * *